UNITED STATES PATENT OFFICE.

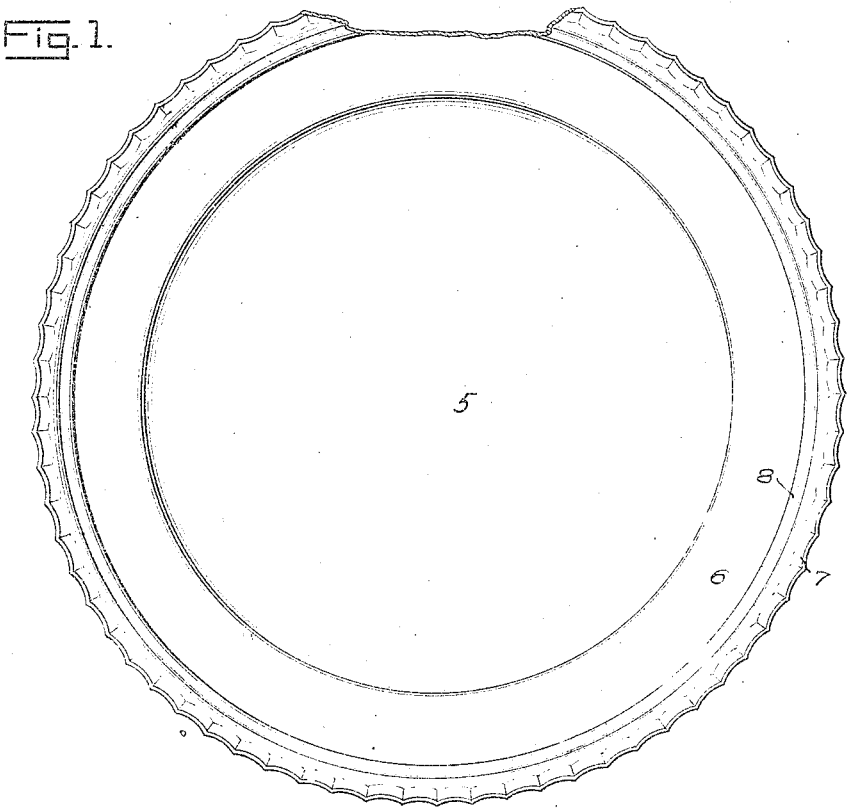
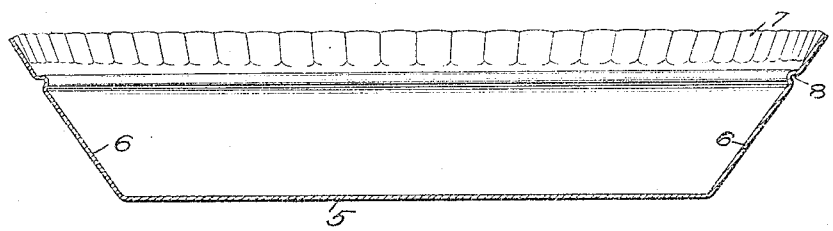

MARGARET L. NOXON, OF NEW YORK, N. Y.

PIE-PAN.

1,175,657.

Specification of Letters Patent.    Patented Mar. 14, 1916.

Application filed April 14, 1915. Serial No. 21,269.

*To all whom it may concern:*

Be it known that I, MARGARET L. NOXON, a citizen of the United States, and a resident of the city of New York, borough of Manhattan, county of New York, and State of New York, have invented a new and Improved Pie-Pan, of which the following is a full, clear, and exact description.

My invention has for its object to provide a pie pan which may be manufactured at little cost and which has an inner bead spaced from the top of the pan and positioned to receive the sides of the undercrust to permit of the upper crust being pressed thereagainst, while the edges of the upper and lower crusts may be pressed against the fluted edge of the pan above the bead.

Additional objects of the invention will appear in the following specification in which the preferred form of my invention is disclosed.

In the drawings similar reference characters refer to similar parts in all the views in which—

Figure 1 is a plan view of the pie pan, parts being broken away to illustrate the construction: and Fig. 2 is a transverse sectional view of Fig. 1.

By referring to the drawings it will be seen that the pie pan has a bottom 5 and upwardly diverging sides 6, the upper portions 7 of these sides 6 being fluted and the sides below the said fluted portions 7 extending inwardly, upwardly and outwardly to form the bead 8. With this construction the lower pie crust may be disposed against the sides 6 of the pan and against the bead and the fluted portion 7, after which a filling may be disposed in the shell formed by the lower crust. An upper crust may then be disposed over the lower crust and be pressed against the lower crust at the bead 8. The undercrust is cut flush with the top of the pan and the upper crust stops at the bead 8. Any juices which may pass between the lower and the upper crusts will be prevented from boiling over by the fluted undercrust formed by the fluted portion 7 of the pan, this fluted portion 7 serving to break the bubbles, etc., and the little channels in the fluted portion directing the juices downwardly. The pie may be removed from the pan by inserting a knife between the lower crust and the fluted portion 7 of the pan, and pressing the knife downwardly against the side 6 of the pan, the knife being then directed along the under surface of the pie, so that the pie may be raised from the pan as desired.

When the pan is used in the manner which has been described, all the juices will be retained in the pan and it will be impossible for them to overflow the pan thereby soiling the oven. It is also possible to readily remove the pie from the pan.

Having thus described my invention I claim as new and desire to secure by Letters Patent:

A pie pan having a bottom and sides extending upwardly therefrom on straight lines, then inwardly and upwardly, then outwardly and upwardly to form a bead against which the upper pie crust may be pressed against the lower pie crust, the sides of the pan above the bead being in substantially the same plane as the sides of the pan below the bead, the sides of the pan above the bead against which the lower pie crust may be pressed, being fluted to give the lower crust a fluted surface to prevent the juices from boiling over the sides of the pan.

In testimony whereof I have signed my name to this specification in the presence of the two subscribing witnesses.

MARGARET L. NOXON.

Witnesses:
 EVERARD B. MARSHALL.
 GEORGE H. EMSLIE.